(12) United States Patent
Liang et al.

(10) Patent No.: US 11,632,761 B2
(45) Date of Patent: Apr. 18, 2023

(54) METHODS AND DEVICES OF RESOURCE MAPPING FOR DATA TRANSMISSION AND OF DATA RECEIVING

(71) Applicant: NEC CORPORATION, Tokyo (JP)

(72) Inventors: Lin Liang, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 81 days.

(21) Appl. No.: 16/967,340

(22) PCT Filed: Feb. 5, 2018

(86) PCT No.: PCT/CN2018/075310
§ 371 (c)(1),
(2) Date: Aug. 4, 2020

(87) PCT Pub. No.: WO2019/148499
PCT Pub. Date: Aug. 8, 2019

(65) Prior Publication Data
US 2021/0051644 A1    Feb. 18, 2021

(51) Int. Cl.
*H04W 72/04* (2009.01)
*H04W 74/08* (2009.01)

(52) U.S. Cl.
CPC ....... *H04W 72/048* (2013.01); *H04W 72/042* (2013.01); *H04W 74/0808* (2013.01)

(58) Field of Classification Search
CPC ............. H04W 72/048; H04W 72/042; H04W 74/0808; H04W 72/0453
See application file for complete search history.

(56) References Cited

U.S. PATENT DOCUMENTS

2016/0157108 A1* 6/2016 Park ................... H04L 25/0328
                                                              370/329
2020/0120693 A1* 4/2020 Wu ................... H04W 72/1263
(Continued)

FOREIGN PATENT DOCUMENTS

| CN | 1909440 A | 2/2007 |
| CN | 101056292 A | 10/2007 |
| CN | 101170743 A | 4/2008 |

(Continued)

OTHER PUBLICATIONS

Written Opinion for PCT/CN2018/075310, dated Oct. 25, 2018.
(Continued)

*Primary Examiner* — John D Blanton
(74) *Attorney, Agent, or Firm* — Sughrue Mion, PLLC

(57) ABSTRACT

Embodiments of the present disclosure relate to methods, devices and apparatus of resource mapping for data transmission and of data receiving. In an embodiment of the present disclosure, a carrier frequency band for the data transmission is divided into a plurality of sub-bandwidths, and the method may include mapping resource elements for the data transmission in an order of sub-bandwidths and mapping, in each of the plurality sub-bandwidths, the resource elements first in an order of frequency domain and then in an order of time domain. With embodiments of the present disclosure, new radio access system with wider bandwidth could co-exist well with other communication on unlicensed band like WiFi.

14 Claims, 10 Drawing Sheets

(56) References Cited

U.S. PATENT DOCUMENTS

2020/0120720 A1\* 4/2020 Wu .................. H04W 72/04
2021/0242988 A1\* 8/2021 Kwak ................ H04L 27/26

FOREIGN PATENT DOCUMENTS

| CN | 102469604 A | 5/2012 |
| --- | --- | --- |
| JP | 2011-142598 A | 7/2011 |
| JP | 2017-17625 A | 1/2017 |
| WO | 2013/020268 A1 | 2/2013 |
| WO | 2013/174695 A1 | 11/2013 |
| WO | 2017/022778 A1 | 2/2017 |
| WO | 2017/056796 A1 | 4/2017 |

OTHER PUBLICATIONS

International Search Report for PCT/CN2018/075310, dated Oct. 25, 2018.
Communication dated Jan. 18, 2022, issued by the Japanese Patent Office in application No. 2020-542277

\* cited by examiner

METHODS AND DEVICES OF RESOURCE MAPPING FOR DATA TRANSMISSION AND OF DATA RECEIVING

CROSS REFERENCE TO RELATED APPLICATIONS

This application is a National Stage of International Application No. PCT/CN2018/075310 filed Feb. 5, 2018.

FIELD OF THE INVENTION

The non-limiting and exemplary embodiments of the present disclosure generally relate to the field of wireless communication techniques, and more particularly relate to methods, devices and apparatuses of resource mapping for data transmission and methods, devices and apparatuses for data receiving.

BACKGROUND OF THE INVENTION

New radio access system, which is also called as NR system or NR network, is the next generation communication system. In Radio Access Network (RAN) #71 meeting for the third generation Partnership Project (3GPP) working group, study of the NR system was approved. The NR system will consider frequency ranging up to 100 Ghz with an object of a single technical framework addressing all usage scenarios, requirements and deployment scenarios defined in Technical Report TR 38.913, which includes requirements such as enhanced mobile broadband, massive machine-type communications, and ultra-reliable and low latency communications.

In order to improve the data rate performance, in 3GPP Long Term Evolution (LTE), there was introduced License Assisted Access (LAA) for both downlink and uplink transmission. As the LTE network enters its next phase of evolution with the study of wider bandwidth waveform under the NR project, it is natural for the LAA networks to evolve into the 5G NR system.

Many features (like Clear Channel Access (CCA), Listen Before Talk (LBT) mechanism, etc.) used in LAA in the LTE system may be maintained due to the similarity between the NR unlicensed band and the LTE unlicensed band. However, there are also some obvious differences, one of which lies in that the NR system supports a much larger maximum transmission bandwidth. Currently, the LAA and the Wi-Fi both have a bandwidth of 20 MHz, and thus some method should be designed for the case that the NR system supports a single carrier band with wider bandwidth, for example 80 MHz or more.

SUMMARY OF THE INVENTION

To this end, in the present disclosure, there is provided a new solution of resource mapping for data transmission and of data receiving in a wireless communication system, to mitigate or at least alleviate at least part of the issues in the prior art.

According to a first aspect of the present disclosure, there is provided a method of resource mapping for data transmission, wherein a carrier frequency band for the data transmission is divided into a plurality of sub-bandwidths. The method may comprise mapping resource elements for the data transmission in an order of sub-bandwidths; and mapping, in each of the plurality sub-bandwidths, the resource elements first in an order of frequency domain and then in an order of time domain.

According to a second aspect of the present disclosure, there is provided a method of data receiving, wherein a carrier frequency band for the data transmission is divided into a plurality of sub-bandwidths. The method may comprise receiving data in resource elements in an order of sub-bandwidths; and receiving, in each of the plurality sub-bandwidths, data in the resource elements first in an order of frequency domain and then in an order of time domain.

According to a third aspect of the present disclosure, there is provided a transmission device, wherein a carrier frequency band for the data transmission is divided into a plurality of sub-bandwidths. The transmission device may comprise a transceiver and a processor. The processor is configured to map resource elements for the data transmission in an order of sub-bandwidths; and map, in each of the plurality sub-bandwidths, the resource elements first in an order of frequency domain and then in an order of time domain.

According to a fourth aspect of the present disclosure, there is provided a receiving device, wherein a carrier frequency band for the data transmission is divided into a plurality of sub-bandwidths. The receiving device may comprise a transceiver configured to receive data in resource elements in an order of sub-bandwidths and receive, in each of the plurality sub-bandwidths, data in the resource elements first in an order of frequency domain and then in an order of time domain.

According to a fifth aspect of the present disclosure, there is provided a network device. The transmission device may comprise a processor and a memory. The memory may be coupled with the processor and having program codes therein, which, when executed on the processor, cause the network device to perform operations of the first aspect.

According to a sixth aspect of the present disclosure, there is provided a receiving device. The terminal device may comprise a processor and a memory. The memory may be coupled with the processor and have program codes therein, which, when executed on the processor, cause the terminal node to perform operations of the second aspect.

According to a seventh aspect of the present disclosure, there is provided a computer-readable storage media with computer program codes embodied thereon, the computer program codes configured to, when executed, cause an apparatus to perform actions in the method according to any embodiment in the first aspect.

According to an eighth aspect of the present disclosure, there is provided a computer-readable storage media with computer program codes embodied thereon, the computer program codes configured to, when executed, cause an apparatus to perform actions in the method according to any embodiment in the second aspect.

According to a ninth aspect of the present disclosure, there is provided a computer program product comprising a computer-readable storage media according to the seventh aspect.

According to a tenth aspect of the present disclosure, there is provided a computer program product comprising a computer-readable storage media according to the eighth aspect.

With embodiments of the present disclosure, there is provided an effective solution for resource mapping for data transmission and thus new radio access system with wider bandwidth could co-exist well with other communication on unlicensed band like WiFi.

BRIEF DESCRIPTION OF THE DRAWINGS

The above and other features of the present disclosure will become more apparent through detailed explanation on the embodiments as illustrated in the embodiments with reference to the accompanying drawings, throughout which like reference numbers represent same or similar components and wherein.

DETAILED DESCRIPTION OF EMBODIMENTS

Figure 1:
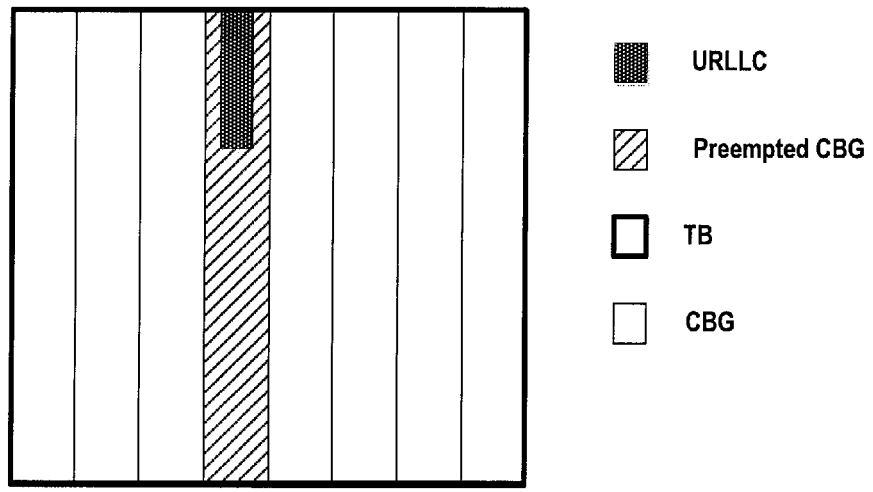
FIG. 1 schematically illustrates code block group (CBG) based retransmission in the existing solution.

Hereinafter, the solution as provided in the present disclosure will be described in details through embodiments with reference to the accompanying drawings. It should be appreciated that these embodiments are presented only to enable those skilled in the art to better understand and implement the present disclosure, not intended to limit the scope of the present disclosure in any manner.

In the accompanying drawings, various embodiments of the present disclosure are illustrated in block diagrams, flow charts and other diagrams. Each block in the flowcharts or blocks may represent a module, a program, or a part of code, which contains one or more executable instructions for performing specified logic functions, and in the present disclosure, a dispensable block is illustrated in a dotted line. Besides, although these blocks are illustrated in particular sequences for performing the steps of the methods, as a matter of fact, they may not necessarily be performed strictly according to the illustrated sequence. For example, they might be performed in reverse sequence or simultaneously, which is dependent on natures of respective operations. It should also be noted that block diagrams and/or each block in the flowcharts and a combination of thereof may be implemented by a dedicated hardware-based system for performing specified functions/operations or by a combination of dedicated hardware and computer instructions.

Generally, all terms used in the claims are to be interpreted according to their ordinary meaning in the technical field, unless explicitly defined otherwise herein. All references to "a/an/the/said [element, device, component, means, step, etc.]" are to be interpreted openly as referring to at least one instance of said element, device, component, means, unit, step, etc., without excluding a plurality of such devices, components, means, units, steps, etc., unless explicitly stated otherwise. Besides, the indefinite article "a/an" as used herein does not exclude a plurality of such steps, units, modules, devices, and objects, and etc.

Additionally, in a context of the present disclosure, user equipment (UE) may refer to a terminal, a Mobile Terminal (MT), a subscriber station, a portable subscriber station, Mobile Station (MS), or an Access Terminal (AT), and some or all of the functions of the UE, the terminal, the MT, the SS, the portable subscriber station, the MS, or the AT may be included. Furthermore, in the context of the present disclosure, the term "BS" may represent, e.g., a node B (NodeB or NB), an evolved NodeB (eNodeB or eNB), gNB (next generation Node B), a radio header (RH), a remote radio head (RRH), a relay, or a low power node such as a femto, a pico, and so on.

As mentioned in Background, the NR system supports a much larger maximum transmission bandwidth and currently, the LAA and the Wi-Fi both have a bandwidth of 20 MHz. Therefore, some method should be designed for the case that the NR system supports a single carrier band with wider bandwidth, for example 80 MHz or more.

For illustrative purposes, FIG. 1 schematically illustrates code block group (CBG) based retransmission in the existing solution. As illustrated in FIG. 1, for Ultra-Reliable and Low Latency Communications (URLLC) where time symbol could be preempted by a high priority service, CBG based retransmission is used. That is to say, a transport block (TB) is divided into a plurality of CBG in time domain. Hybrid Automatic Repeat reQuest-Acknowledge (HARQ-ACK) feedback and retransmission can be performed on a CBG level. In other words, if some OFDM symbols are preempted by other higher priority service, only CBGs with preempted OFDM symbols are affected and require to retransmit, other CBGs can be decoded successfully and does not need to retransmit.

In the NR system, if the carrier aggregation of multiple bands is performed with bandwidth of 20 MHz (i.e. one TB per band), it might not cause any problem. However, if a single carrier band has a wider bandwidth 80 MHz, 100 MHz or higher, some issues may occur and the CBG bases retransmission cannot address the issues either. For example, subband interference like 20 MHz Wi-Fi signal will block the whole band NR transmission.

Figure 2:
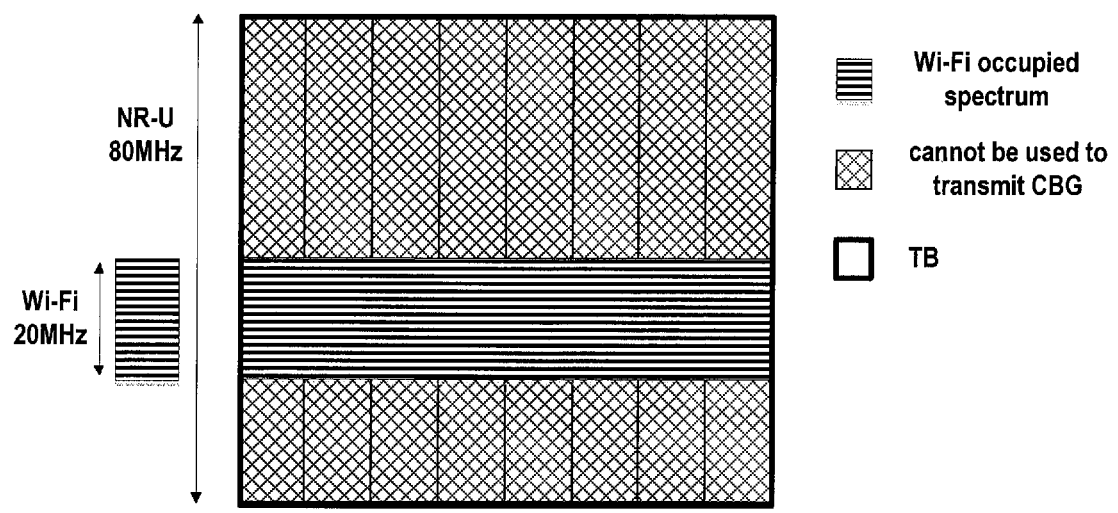
FIG. 2 schematically illustrates a case in which a part of carrier band is occupied by WiFi.

FIG. 2 schematically illustrates a case in which a part of carrier band is occupied by WiFi. As illustrated in FIG. 2, the carrier bandwidth of NR-U may be for example 80 MHz, the carrier bandwidth of Wi-Fi or LAA is 20 MHz. Under the existing LBT mechanism, once Wi-Fi occupies the channel resources, the NR system cannot transmit the entire 80 MHz even if the TB is divided into a plurality of CBGs. This is because on unlicensed band, CCA is a real-time assessment and if the channel suddenly becomes busy just before transmission, there is no time left for adjusting or rating match transmission signals but puncturing. Thus, according to the current solution, all CBGs in one TB cannot be decoded successfully once being punctured due to LBT.

To this end, in the present disclosure, there is proposed a new solution of resource mapping for data transmission, which could mitigate or at least alleviate at least part of the issues in the prior art. In the present disclosure, it is proposed a new resource mapping solution based on sub-bandwidth wherein the carrier bandwidth is further divided into a plurality of sub-bandwidth and the retransmission can be performed based on sub-bandwidth. Thus, only sub-bandwidth affected by WiFi transmission cannot be used for NR transmission. Hereinafter, reference will be further made to FIGS. 3 to 19 to describe the solutions as proposed in the present disclosure in details. However, it shall be appreciated that the following embodiments are given only for illustrative purposes and the present disclosure is not limited thereto.

Figure 3:
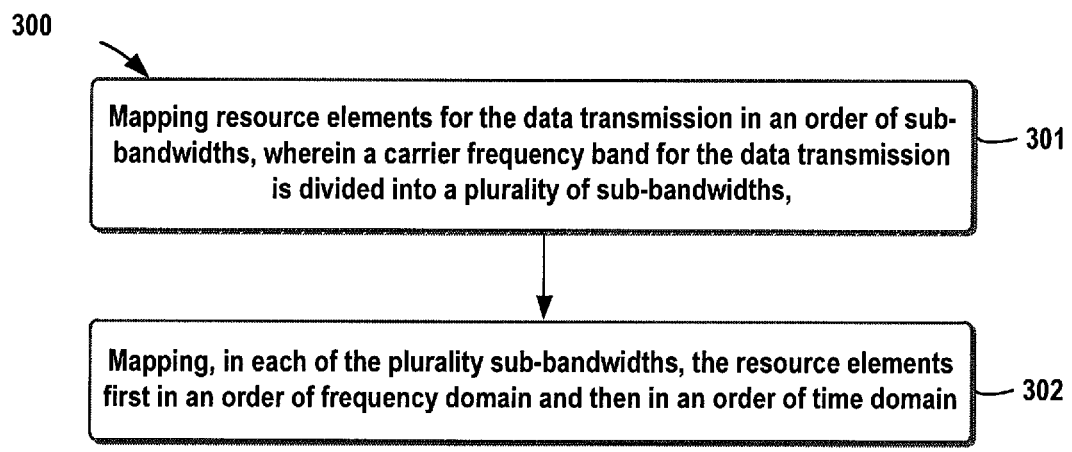
FIG. 3 schematically illustrates a flow chart of a method of resource mapping for data transmission according to an embodiment of the present disclosure.

FIG. 3 schematically illustrates a flow chart of a method 300 of resource mapping for data in a wireless communication system according to an embodiment of the present disclosure. The method 300 may be performed at a data transmission device, for example eNB for the downlink data transmission, or a terminal device of the uplink data transmission.

As illustrated in FIG. 3, in step 301, resource elements for the data transmission are first mapping in an order of sub-bandwidths, wherein a carrier frequency band for the data transmission is divided into a plurality of sub-bandwidths.

As mentioned, the carrier bandwidth cab be further divided into a plurality of sub-bandwidth and the retransmission can be performed based on sub-bandwidth. Thus, only sub-bandwidth affected by WiFi transmission cannot be used for NR transmission.

Figure 4:
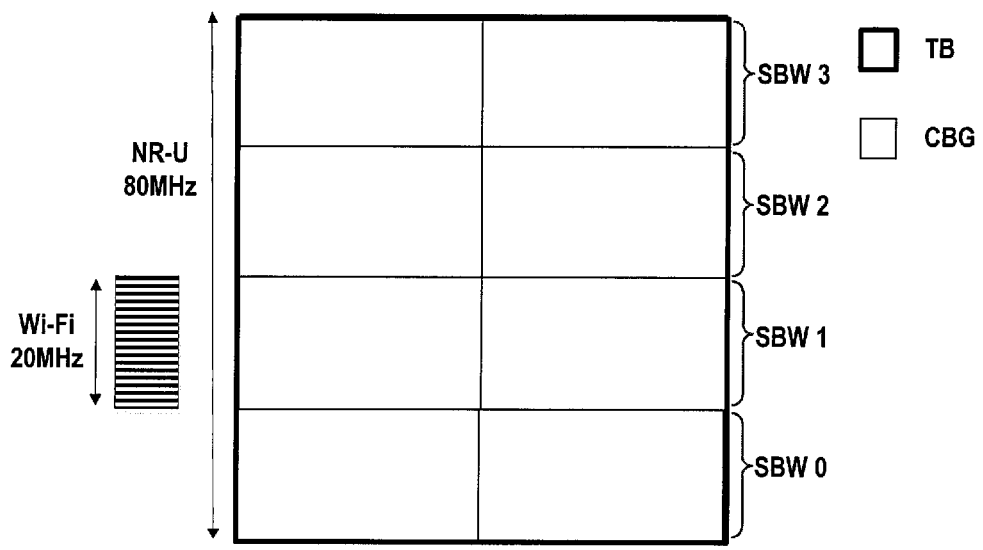
FIG. 4 schematically illustrates an example carrier bandwidth division and resource mapping according to an embodiment of the present disclosure.

Reference may be made to FIG. 4, which schematically illustrates an example resource mapping in case of carrier bandwidth division according to an embodiment of the present disclosure. As illustrated in FIG. 4, the carrier bandwidth of 80 MHz is illustrated as an example and the carrier bandwidth is further divided into four sub-bandwidths, SBW 0, SBW 1, SBW 2 and SBW 3. In resource mapping, the resource mapping is first performed in an order of sub-bandwidths. For example, the resource mapping is first performed in SBW 0, then in SBW 1, next in SBW 2 and final in SBW 3.

Reference is made back to FIG. 3, in step 302, in each of the plurality of sub-bandwidths, the resource elements are mapped first in an order of frequency domain and then in an order of time domain. In other words, resource elements are mapped first in an order of the frequency domain until no subcarrier in the sub-bandwidth is left and then mapped to the next time domain resource.

Reference may be made to FIG. 4 again. The resource elements are first mapped in the SBW 0 in the left half for the first CBG and then mapped in the SBW 0 in the right half for the second CBG Next, resource elements can be mapped in the SBW 1, SBW 2, SBW 3 in the same manner.

Figure 5:
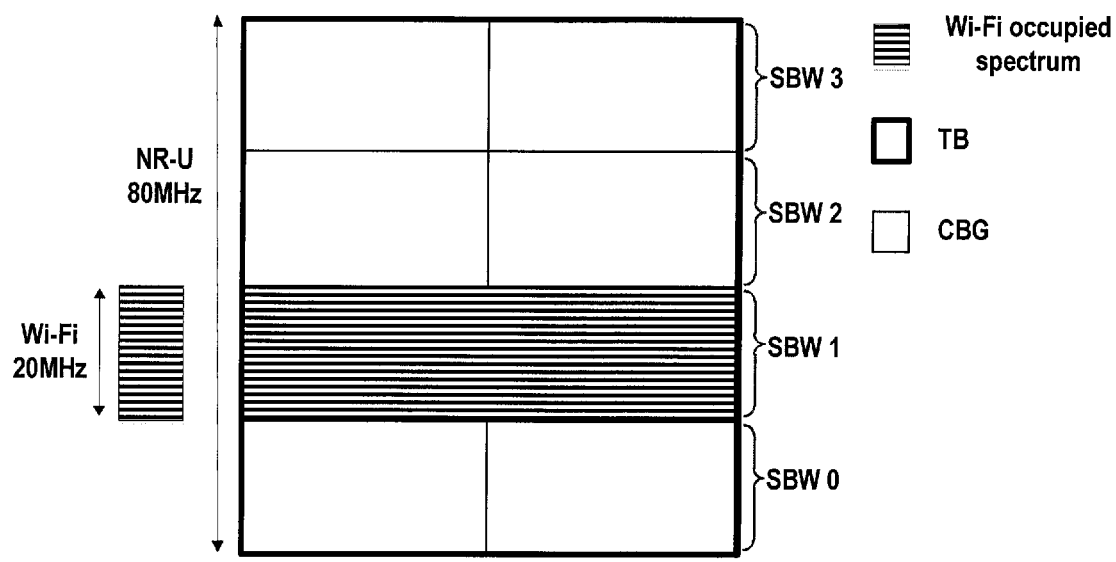
FIG. 5 schematically illustrates another example resource mapping in case of carrier bandwidth division according to an embodiment of the present disclosure.

If the WiFi occupies a SBW suddenly before transmission, then only CBGs in the SBW are affected and require to be retransmitted. As illustrated in FIG. 5, the WiFi occupies the resource elements in SBW1. Thus, the SBW 1 cannot be used to transmit CBGs and are punctured. Thus, only two CBGs in the SBW 1 are affected and required to be retransmitted. Therefore, in the present disclosure, retransmission can be performed on a sub-bandwidth level and the NR system with wider bandwidth could co-exist well with LAA and WiFi.

Figure 6:
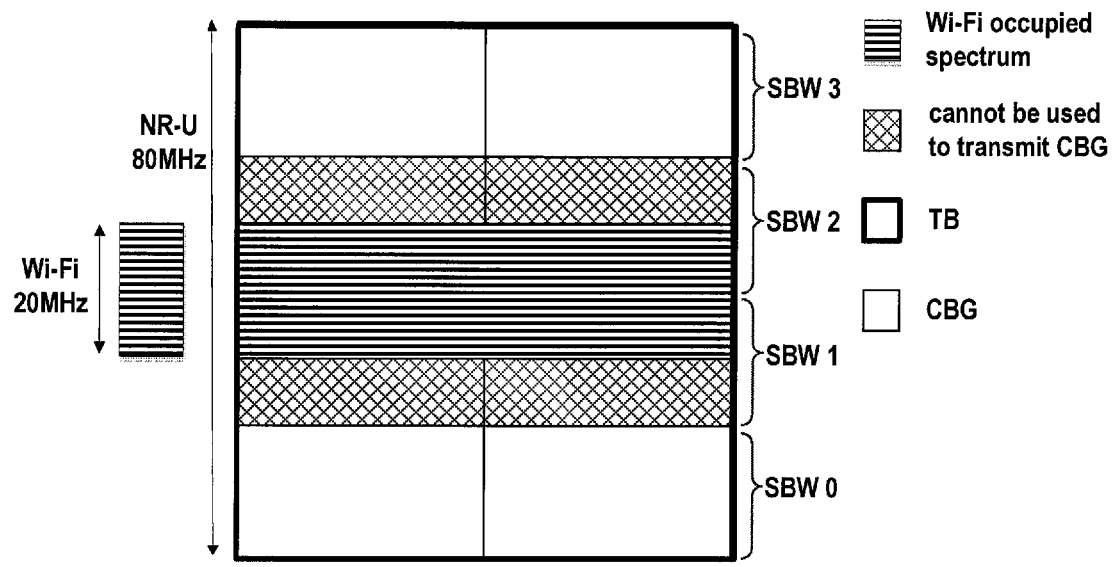
FIG. 6 schematically illustrates a further example resource mapping in case of carrier bandwidth division according to an embodiment of the present disclosure.

In addition, the WiFi might also occupy more than one sub-bandwidth, if the WiFi's band boundary is not aligned with a sub-bandwidth's boundary. In such a case, more than one sub-bandwidth would be affected. As illustrated in FIG. 6. The WiFi signals occupy a part of SBW 1 and a part of SBW 2. In such a case, neither of SBW 1 and SBW 2 can be used to transmit CBGs and thus four CBGs in SBW 1 and SBW 2 are affected and required to be retransmitted.

Figure 7:
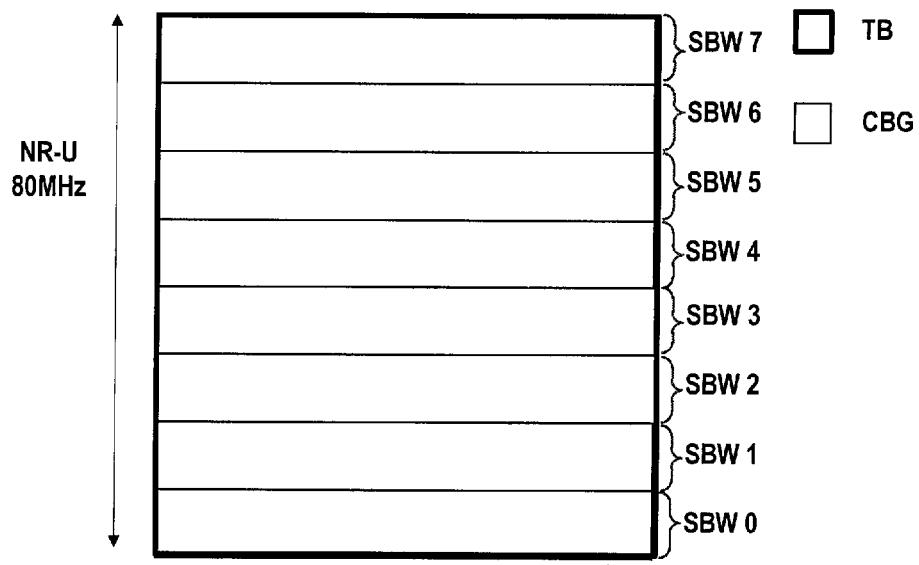
FIG. 7 schematically illustrates another example resource mapping in case of carrier bandwidth division according to an embodiment of the present disclosure.
Figure 8:
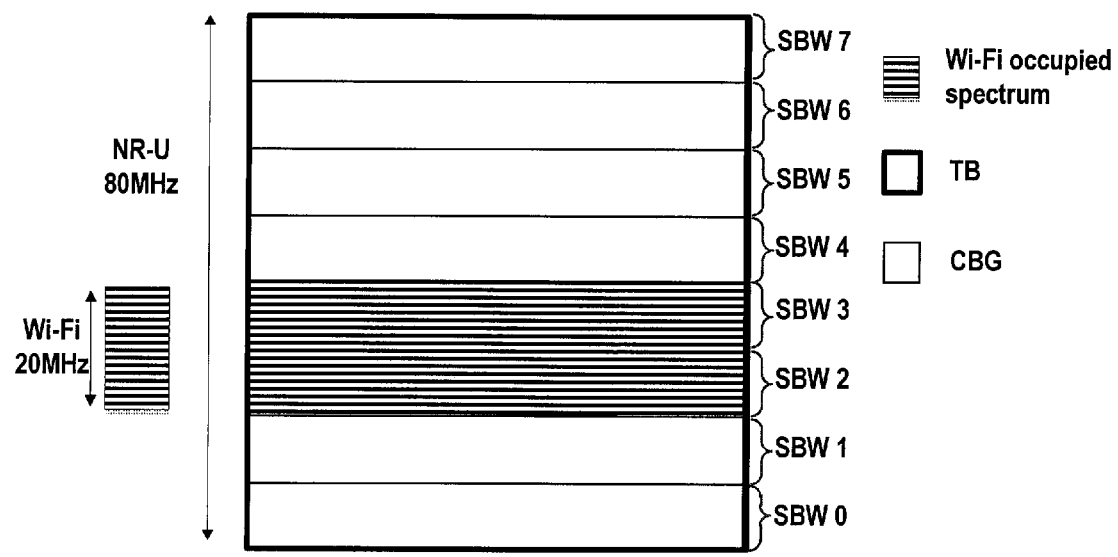
FIG. 8 schematically illustrates a further example resource mapping in case of carrier bandwidth division according to an embodiment of the present disclosure.
Figure 9:
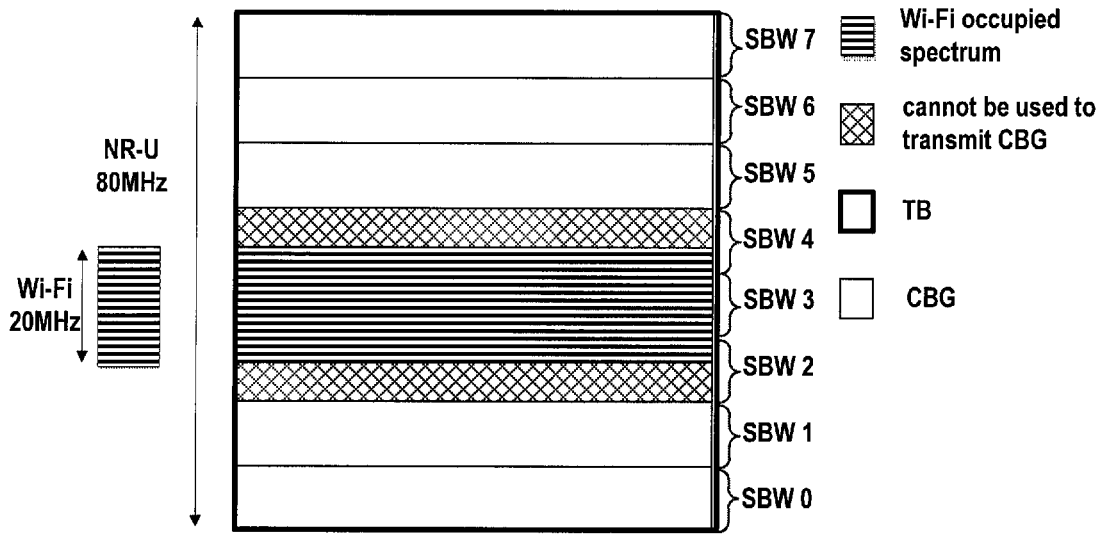
FIG. 9 schematically illustrates a still further example resource mapping in case of carrier bandwidth division according to an embodiment of the present disclosure.

In an embodiment of the present disclosure, the carrier bandwidth can be divided into narrower sub-bandwidths to further reduce effects of the WiFi. FIG. 7 schematically illustrates another example resource mapping in case of carrier bandwidth division according to an embodiment of the present disclosure. In FIG. 7, the carrier bandwidth is divided into eight sub-bandwidths instead of four sub-bandwidths in FIG. 4. The resource elements are still mapped in a similar manner. That is to say, the resource elements are first mapped in the SBW 0 in the left half for the first half bits of the first CBG and then mapped in the SBW 0 in the right half for the second half bits of the first CBG Next, resource elements can be mapped in the SBW 1 to SBW 7 in the same manner. In FIG. 7, a CBG just uses all resource elements in a sub-bandwidth FIG. 8 schematically illustrates a further example resource mapping in case of carrier bandwidth division according to an embodiment of the present disclosure. As illustrated in FIG. 8, if the WiFi's band boundary is aligned with a sub-bandwidth's boundary, then only two sub-bandwidths are affected, which is similar to that in FIG. 5. However, if the WiFi's band boundary is not aligned with a sub-bandwidth's boundary, narrower sub-bandwidths could provide further benefits. Reference could be made to FIG. 9 which schematically illustrates a still further example resource mapping in case of carrier bandwidth division according to an embodiment of the present disclosure. As illustrated in FIG. 9, the WiFi's band boundary is not aligned with a sub-bandwidth's boundary, and thus SBW 2, SBW 3 and SBW 4 are occupied. In such a case only three CBGs are affected and required to retransmit. Thus, compared to that illustrated in FIG. 6, less CBGs are affected.

Generally speaking, the more the bandwidth is divided, the narrower the sub-bandwidth is and more resource utilization can be achieved.

For 80 MHz band of the NR system, a typical number of sub-bandwidth could be 1, 4, and 8; for 100 MHz band of the NR system, a typical number of sub-bandwidth could be 1, 5, and 10. "1" is used to be compatible with the existing solutions and "4" "8" and "5" "10" are used to balance decoding latency and resource utilization.

The method described above can be used for both the downlink data transmission and the uplink data transmission. Hereinafter, for illustrative purposes, methods for the downlink data transmission and the uplink data transmission will be described with FIGS. 10 and 11 respectively.

Figure 10:
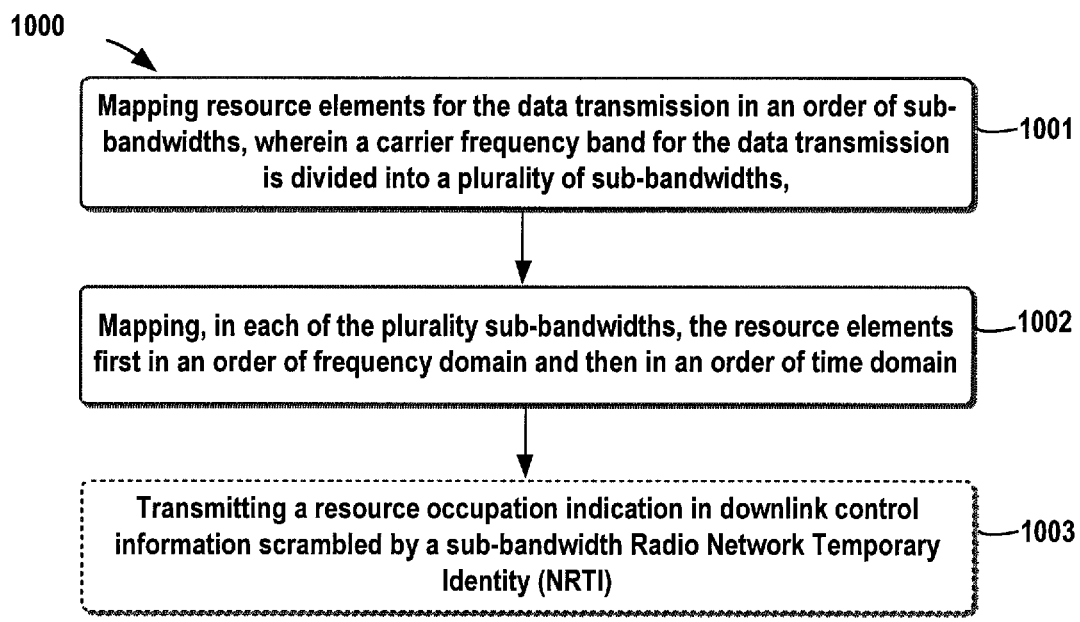
FIG. 10 schematically illustrates a flow chart of an example method of resource mapping for downlink data transmission according to an embodiment of the present disclosure.

Reference is first made to FIG. 10, which schematically illustrates a flow chart of an example method of resource mapping for downlink data transmission according to an embodiment of the present disclosure. The method 1000 can be performed at a network device like gNB or any other suitable network device.

As illustrated in FIG. 10, in step 1001, resource elements for the data transmission are first mapped in an order of sub-bandwidths, wherein a carrier frequency band for the data transmission is divided into a plurality of sub-bandwidths. In step 1002, in each of the plurality of sub-bandwidths, the resource elements are mapped first in an order of frequency domain and then in an order of time domain. In other words, resource elements are mapped first in an order of the frequency domain until no subcarrier in the sub-bandwidth is left and then mapped to the next time domain resource.

Operations in steps 1001 and 1002 are substantially same as that in steps 301 and 302 in FIG. 3 and thus will not be elaborated herein. For details, one could refer to the above description with regard to FIGS. 3 to 9.

Further in step 1003, the gNB may further transmit a resource occupation indication in downlink control information scrambled by a sub-bandwidth Radio Network Temporary Identity (RNTI).

In a case that WiFi occupies one or more sub-bandwidths, some edge RBs may not be transmitted within the occupied sub-bandwidths, if the neighbor band is not transmitted. In this way, an SBW-INT-RNTI provided by higher layer parameter for monitoring physical downlink control channel (PDCCH) for conveying DCI could be signaled to UE to indicate that which RBs are not used for data transmission. One bit in Downlink control indication (DCI) could be used to signal the terminal device whether to monitor SBW-INT-RNTI after the transmission of scheduled PDSCH or not.

The occupation resources indication is the same as PDSCH frequency resource allocation type 0. The occupation resources indication is identified by the terminal device by means of SBW-INT-RNTI. Common DCI scrambled by SBW-INT-RNTI and retransmission of missing CBGs may occur within Maximum Channel Occupancy Time (MCOT) of transmission burst.

In addition, control channel must be transmitted in one burst, thus it requires a solution to guarantee the transmission of PDCCH. In existing LAA, cat. 4 LBT with exponential random back off is specified for CCA. When CA is used, in the band near each other, the terminal devices cannot transmit on one band and listen on the other band simultaneously. In this regard, the following two types are provided to deal with CA case.

Type A: distributed, every band can do LBT independently. Only carriers which finish the LBT can access channel. Early finished LBT carriers can wait for later carriers, which depends on implementations.

Type B: centralized, only a primary carrier does LBT. After finished, a quick CCA is done on all carriers, and idle carriers can access channel this time.

However, due to the carrier has a wider band, in the present disclosure, it is proposed to perform the LBT operation on a sub-bandwidth level. In other words, a sub-bandwidth group containing a plurality of sub-bandwidth is used together for LBT. In order to ensure the transmission of PDCCH under LBT, there are also provided two types of transmissions.

Type A:
A plurality of sub-bandwidths form a sub-bandwidth group for LBT. Distributed, and every sub-bandwidth can do LBT independently. Only carriers which finish the LBT can access channel.

Each sub-bandwidth has its back off timer as LAA type A. Multiple CORESET occasions are provided on each sub-bandwidth group. For example, each sub-bandwidth used in the LBT operation has a control information transmission occasion. The gNB may transmit the PDCCH on any and/or all of these occasions. Thus PDCCH could always be transmitted no matter how the sub-bandwidth is blocked due to LBT.

The gNB may transmit the PDCCH on a these occasions based on its processing capability. If the gNB does not have a sufficient high processing speed, then it can only puncture. In such a case, the gNB requires transmitting the PDCCH on each of the sub-bandwidth. On the other hand, if the gNB has a sufficient high processing speed, it can select one of the sub-bandwidths. In such a case, it is possible to select the sub-bandwidth for PDCCH in a predetermined pattern. For example, these control information transmission occasions in the LBT operation can be prioritized based on frequencies of respective sub-bandwidths order. In such a way, the terminal device could detect control information in a priority based on frequencies of respective sub-bandwidths, instead of blind detection.

Type B:
A plurality of sub-bandwidths form a sub-bandwidth group for LBT Centralized, and only a primary carrier does the LBT. After finished, a quick CCA is done on all carriers, and idle carriers can access channel this time.

The primary bandwidth group has its back off timer as LAA type B. In order to ensure the transmission of PDCCH, CORESET must be located within the primary sub-bandwidth. That is to say, the primary sub-bandwidth shall be selected based on the control information transmission scheduling. In this case, PDCCH is in primary bandwidth group which is always transmitted.

It shall be notice that the above solution for ensuring the PDCCH transmission is described with reference to the resource mapping as proposed therein; however, this solution is not dependent on the proposed resource mapping. In fact, this solution can also be used in other cases requiring ensuring the PDCCH transmission.

The operations in uplink data transmission are different from those in the downlink data transmission. Next, reference will be made to FIG. 11 to describe an example method of resource mapping for uplink data transmission according to an embodiment of the present disclosure. The method can be performed at a terminal device like UE or any other suitable terminal device.

Figure 11:
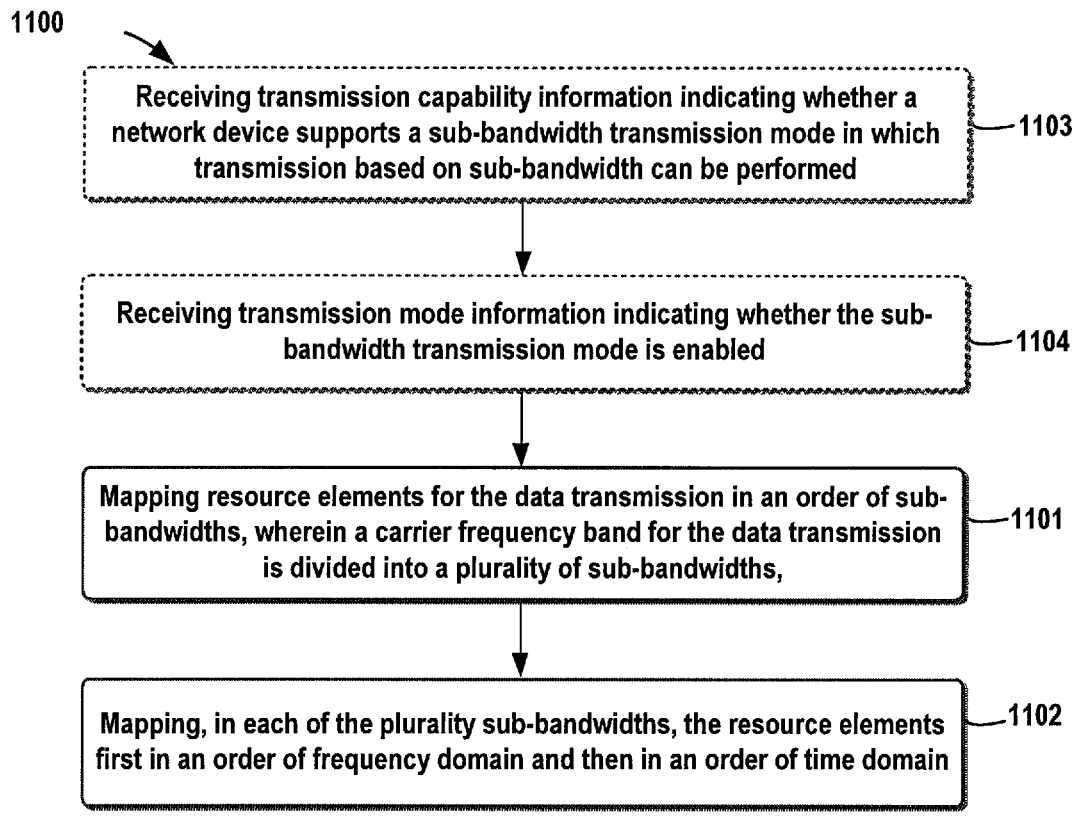
FIG. 11 schematically illustrates a flow chart of an example method of resource mapping for uplink data transmission according to an embodiment of the present disclosure.

As illustrated in FIG. 11, in step 1101, resource elements for the data transmission are first mapping in an order of sub-bandwidths, wherein a carrier frequency band for the data transmission is divided into a plurality of sub-bandwidths. In step 1102, in each of the plurality of sub-bandwidths, the resource elements are mapped first in an order of frequency domain and then in an order of time domain. In other words, resource elements are mapped first in an order of the frequency domain until no subcarrier in the sub-bandwidth is left and then mapped to the next time domain resource.

Operations in steps 1101 and 1102 are substantially same as that in steps 301 and 302 in FIG. 3 and thus will not be elaborated herein. For details, one could refer to the above description with regard to FIGS. 3 to 9.

As further illustrated in step 1103, before mapping operations in steps 1101 and 1102, the terminal device may first receive transmission capability information from a network device. The transmission capability information may indicate whether a network device supports a sub-bandwidth transmission mode in which resource mapping based on sub-bandwidth can be performed. In other word, the transmission capability information is used to indicate whether the resource mapping as proposed herein is supported by the network device. Usually, if the gNB can do blind detection in absence of a part of transmission or not buffering wrong decoded soft information, the gNB could support the sub-bandwidth transmission mode. This transmission capability information can be transmitted to the terminal device through, for example, a radio resource control (RRC) signaling.

In a case that the gNB could support the sub-bandwidth transmission mode, the gNB can still determine whether to enable the sub-bandwidth transmission mode. Thus, in step 1104, the terminal device may further receive transmission mode information indicating whether the sub-bandwidth transmission mode is enabled. For example, the following two modes can be configured:

Mode 1
The sub-bandwidth transmission is disabled, which means if a part of scheduled band cannot transmit due to LBT, the UE will transmit nothing on the whole carrier band. The scheduling validation is implemented by the gNB, which means the gNB can increase channel access probability, for example 25us quick CCA within MCOT.

Mode 2:
The sub-bandwidth transmission is enabled. The sub-bandwidth based resource mapping is used to ensure that only part of CBGs is influenced.

Mode 1 or Mode 2 can be signaled from the gNB by one bit in grant DCI.

Thus, in response to the transmission capability information indicating that the network device supports the sub-bandwidth transmission mode and the transmission mode information indicating that the sub-bandwidth transmission mode is enabled, the sub-bandwidth based resource mapping (operations of steps 1101 and 1102) will be performed.

Next, reference will be made to FIGS. 12 to 14 to describe example methods of receiving data according to embodiments of the present disclosure.

Figure 12:
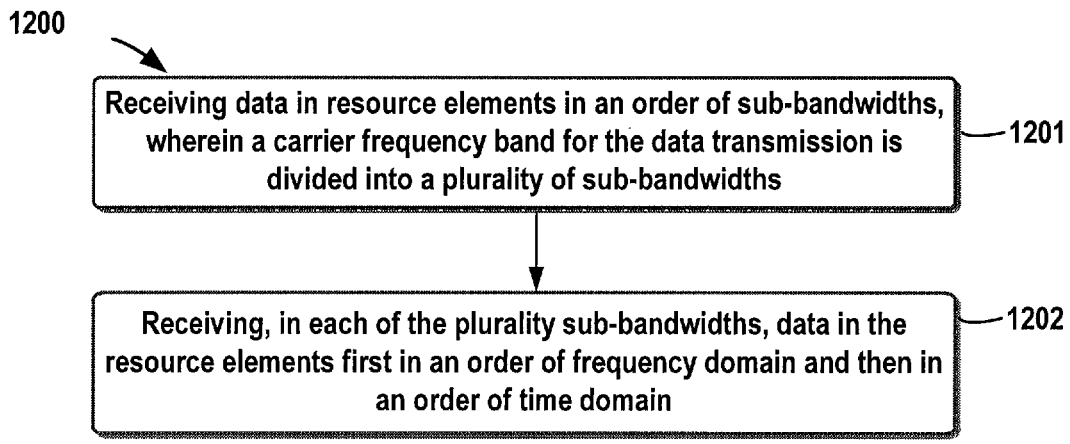
FIG. 12 schematically illustrates a flow chart of a method of receiving data according to an embodiment of the present disclosure.

Reference is first made to FIG. 12, which schematically illustrates a flow chart of a method of receiving data according to an embodiment of the present disclosure. As illustrated in FIG. 12, in step 1201, data is received in resource elements in an order of sub-bandwidths, wherein a carrier frequency band for the data transmission is divided into a plurality of sub-bandwidths. As mentioned above, the carrier bandwidth cab be further divided into a plurality of sub-bandwidth and the retransmission can be performed based on sub-bandwidth.

Then in step 1202, in each of the plurality sub-bandwidths, data is received in the resource elements first in an order of frequency domain and then in an order of time domain. In other words, data is received in resource elements in an order of the frequency domain until no subcarrier in the sub-bandwidth is left and then received in the next time domain resource.

For 80 MHz band of the NR system, a typical number of sub-bandwidth could be 1, 4, and 8; for 100 MHz band of the NR system, a typical number of sub-bandwidth could be 1, 5, and 10. "1" is used to be compatible with the existing solutions and "4" "8" and "5" "10" are used to balance decoding latency and resource utilization.

Regarding details the divisions of the carrier band or the mapped resource elements for the CBG, one can refer to the above description with reference to FIGS. 3 to 11.

The data receiving method described above can be used for both the downlink data transmission and the uplink data transmission. Hereinafter, for illustrative purposes, methods for the downlink data transmission and the uplink data transmission will be described with FIGS. 13 and 14 respectively.

Figure 13:
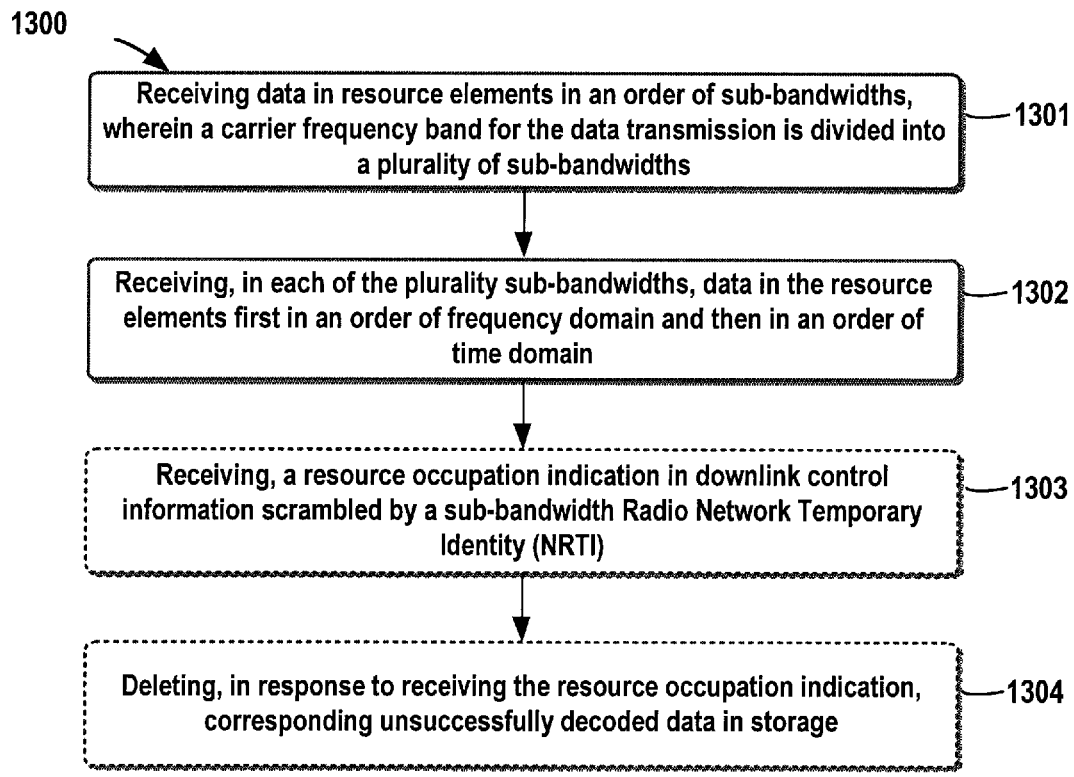
FIG. 13 schematically illustrates a flow chart of a method for receiving downlink data according to an embodiment of the present disclosure.

Reference is first made to FIG. 13, which schematically illustrates a flow chart of an example method of receiving downlink data according to an embodiment of the present disclosure. The method can be performed at a terminal device like UE or any other suitable terminal device.

As illustrated in FIG. 13, in step 1301, data is received in resource elements in an order of sub-bandwidths, wherein a carrier frequency band for the data transmission is divided into a plurality of sub-bandwidths. As mentioned above, the carrier bandwidth cab be further divided into a plurality of sub-bandwidth and the retransmission can be performed based on sub-bandwidth.

In step 1302, in each of the plurality sub-bandwidths, data is received in the resource elements first in an order of frequency domain and then in an order of time domain. In other words, data is received in resource elements in an order of the frequency domain until no subcarrier in the sub-bandwidth is left and then received in the next time domain resource.

Operations in steps 1301 and 1302 are substantially same as that in steps 1201 and 1202 in FIG. 12 and thus will not be elaborated herein. For details, one could refer to the above description with regard to FIGS. 3 to 12.

Further in step 1303, the gNB may further receive a resource occupation indication in downlink control information scrambled by a sub-bandwidth Radio Network Temporary Identity (RNTI).

As mentioned above, in a case that WiFi occupies one or more sub-bandwidths, some edge RBs may not be transmitted within the occupied sub-bandwidths, if the neighbor band is not transmitted. In this way, an SBW-INT-RNTI provided by higher layer parameter for monitoring physical downlink control channel (PDCCH) for conveying DCI could be signaled to UE to indicate that which RBs are not used for data transmission. One bit in Downlink control indication (DCI) could be used to signal the terminal device whether to monitor SBW-INT-RNTI after the transmission of scheduled PDSCH or not.

The occupation resources indication is the same as PDSCH frequency resource allocation type 0. The terminal device could identify the occupation resources indication by the terminal device by means of SBW-INT-RNTI. Common DCI scrambled by SBW-INT-RNTI and retransmission of missing CBGs may occur within Maximum Channel Occupancy Time (MCOT) of transmission burst.

Further in step 1304, in response to receiving such a resource occupation indication, the terminal device may delete the corresponding unsuccessfully decoded data in storage. Different from HARQ, if a sub-bandwidth is suddenly occupied by WiFi, there is no time left for adjusting or rating match transmission signals an thus the sub-bandwidth will be punctured. In such a case, the CBG is not transmitted and thus it is unnecessary to store corresponding unsuccessfully decoded data has no use. Therefore, these data can be deleted from the storage.

In addition, control channel must be transmitted in one burst, thus it requires a solution to guarantee the transmission of PDCCH. Thus, for the Type A as mentioned above, if these control information transmission occasions in the LBT operation are prioritized based on frequencies of respective sub-bandwidths order, the terminal device may detect control information in a priority based on frequencies of respective sub-bandwidths. For other cases in Type A and for Type B, the terminal device may detect the PDCCH as did in the existing LAA.

Operations in uplink data receiving are different from those in the downlink data transmission. Next, reference will be made to FIG. 14 to describe an example method of resource mapping for uplink data transmission according to an embodiment of the present disclosure. The method can be performed at a network device like UE or any other suitable network device.

Figure 14:
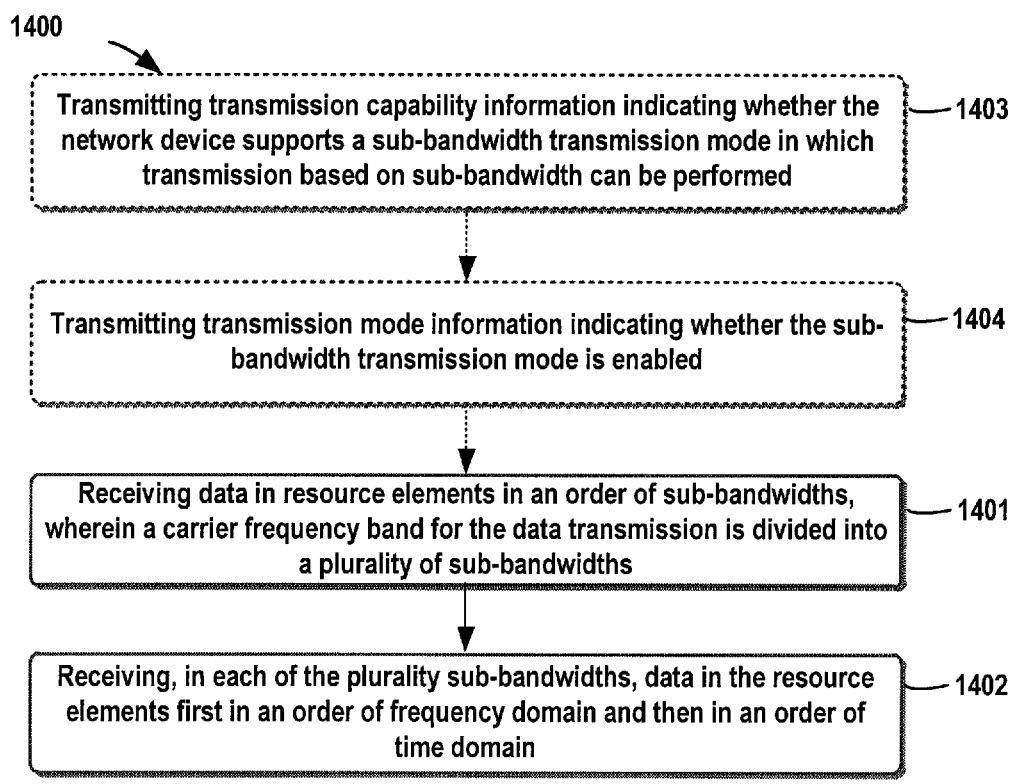
FIG. 14 schematically illustrates a flow chart of a method for receiving uplink data according to an embodiment of the present disclosure.

As illustrated in FIG. 14, in step 1401, data is received in resource elements in an order of sub-bandwidths, wherein a carrier frequency band for the data transmission is divided into a plurality of sub-bandwidths. As mentioned above, the carrier bandwidth cab be further divided into a plurality of sub-bandwidth and the retransmission can be performed based on sub-bandwidth.

In step 1402, in each of the plurality sub-bandwidths, data is received in the resource elements first in an order of frequency domain and then in an order of time domain. In other words, data is received in resource elements in an order of the frequency domain until no subcarrier in the sub-bandwidth is left and then received in the next time domain resource.

Operations in steps 1401 and 1402 are substantially same as that in steps 1201 and 1202 in FIG. 12 and thus will not be elaborated herein. For details, one could refer to the above description with regard to FIGS. 3 to 12.

As further illustrated in step 1403, before receiving uplink data based on sub-bandwidth in steps 1401 and 1402, the network device may first transmit transmission capability information to a terminal device. The transmission capability information may indicate whether a network device supports a sub-bandwidth transmission mode in which resource mapping based on sub-bandwidth can be performed. In other word, the transmission capability information is used to indicate whether the resource mapping as proposed herein is supported by the network device. Usually, if the gNB can do blind detection in absence of a part of transmission or not buffering wrong decoded soft information, the gNB could support the sub-bandwidth transmission mode. This transmission capability information can be transmitted to the terminal device through, for example, a radio resource control (RRC) signaling.

In a case that the gNB could support the sub-bandwidth transmission mode, the gNB can still determine whether to enable the sub-bandwidth transmission mode. Thus, in step 1404, the network device may further transmit transmission mode information indicating whether the sub-bandwidth transmission mode is enabled. As mentioned, Mode 1 indicates a mode in which the sub-bandwidth transmission is disabled. Mode 2 indicates a mode in which the sub-bandwidth transmission is enabled. Mode 1 or Mode 2 can be signaled from the gNB by one bit in grant DCI.

Thus, in response to the transmission capability information indicating that the network device supports the sub-bandwidth transmission mode and the transmission mode information indicating that the sub-bandwidth transmission mode is enable, the sub-bandwidth based date receiving (operations of steps 1401 and 1402) will be performed.

Hereinabove, embodiments of data receiving are described in brief hereinbefore with reference to FIGS. 12 to 14. However, it can be understood that operations at the receiving device are corresponding to those at the transmission device and thus for some details of operations, one may refer to description with reference to FIGS. 3 to 11.

Hereinbefore, it is described that the carrier band is divided into a plurality of sub-bandwidths, resource elements are first mapped in an order of the sub-bandwidth, and in respective sub-bandwidths, resource elements are mapped first in frequency domain and then in the domain. However, it can also be understood that in each of sub-bandwidths, it is also possible to map resource elements first in time domain and then in the frequency domain.

Figure 15:
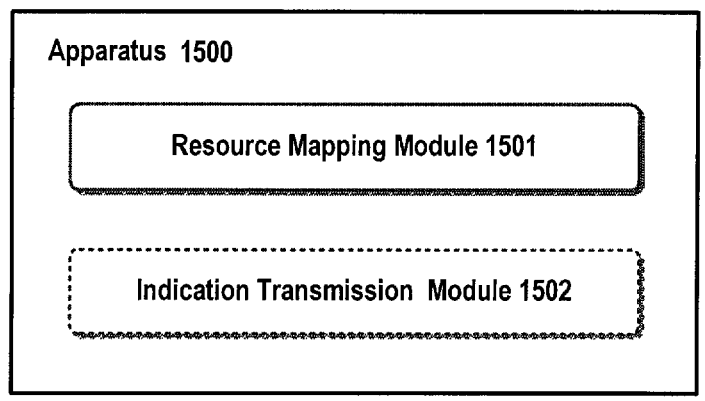
FIG. 15 schematically illustrates a block diagram of an apparatus for resource mapping for downlink data transmission according to an embodiment of the present disclosure.

FIG. 15 further schematically illustrates a block diagram of an apparatus for resource mapping for downlink data transmission in a wireless communication system according to an embodiment of the present disclosure. The apparatus 1500 can be implemented at a network device, for example eNB, or other like network devices.

As illustrated in FIG. 1500, the apparatus 1500 may include a resource mapping module 1501. The carrier frequency band for the data transmission is divided into a plurality of sub-bandwidths. The resource mapping module 1501 may be configured to map resource elements for the data transmission in an order of sub-bandwidths; and map, in each of the plurality sub-bandwidths, the resource elements first in an order of frequency domain and then in an order of time domain.

The apparatus 1500 may further comprise an indication transmission module 1502. The indication transmission module 1502 may be configured to transmit a resource occupation indication in downlink control information scrambled by a sub-bandwidth Radio Network Temporary Identity (NRTI). The resource occupation indication will inform a terminal device which resources are occupied and will be transmitted.

In an embodiment of the present disclosure, a listen before talk (LBT) operation is performed on a sub-bandwidth level, and each sub-bandwidth used in the LBT operation may have a control information transmission occasion so as to ensure the transmission of the PDCCH.

In another embodiment of the present disclosure, a listen before talk (LBT) operation is performed on a sub-bandwidth level, and a primary sub-bandwidth is selected based on the control information transmission scheduling. In this way, it is also possible to ensure the transmission of the PDCCH.

Figure 16:
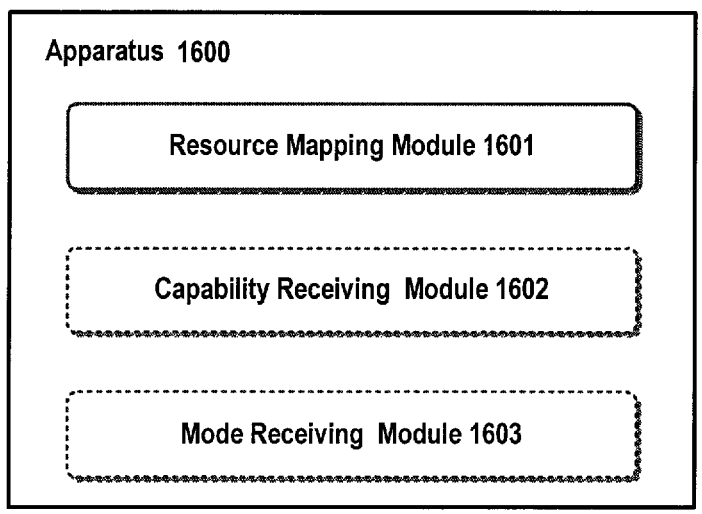
FIG. 16 schematically illustrates a block diagram of an apparatus for resource mapping for uplink data transmission according to an embodiment of the present disclosure.

FIG. 16 schematically illustrates a block diagram of an apparatus for resource mapping for uplink data transmission in a wireless communication system according to an embodiment of the present disclosure. The apparatus 1600 may be implemented at a terminal device, for example UE, or other like terminal devices.

As illustrated in FIG. 16, the apparatus 1600 may include a resource mapping module 1601. The carrier frequency band for the data transmission is divided into a plurality of sub-bandwidths. The resource mapping module 1601 may be configured to map resource elements for the data transmission in an order of sub-bandwidths; and map, in each of the plurality sub-bandwidths, the resource elements first in an order of frequency domain and then in an order of time domain.

In an embodiment of the present disclosure, the apparatus 1600 may further comprise a capability receiving module 1602 and a mode receiving module 1603. The capability receiving module 1602 may be configured to receive transmission capability information indicating whether a network device supports a sub-bandwidth transmission mode in which resource mapping based on sub-bandwidth can be performed. The mode receiving module 1603 may be configured to receive, transmission mode information indicating whether the sub-bandwidth transmission mode is enabled. The resource mapping module 1601 is configured to map resource elements in response to the transmission capability information indicating that the network device supports the sub-bandwidth transmission mode and the transmission mode information indicating that the sub-bandwidth transmission mode is enabled.

The transmission capability information may be received in an RRC signaling. The transmission mode information may be received in a downlink control indication.

Figure 17:
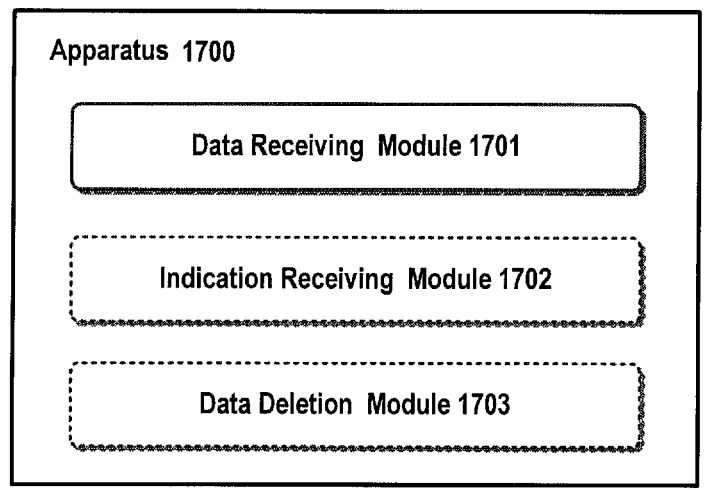
FIG. 17 schematically illustrates a block diagram of an apparatus for receiving downlink data according to an embodiment of the present disclosure.

FIG. 17 schematically illustrates a block diagram of an apparatus for downlink data receiving in a wireless communication system according to an embodiment of the present disclosure. The apparatus 1700 may be implemented at a terminal device, for example UE, or other like terminal devices.

As illustrated in FIG. 17, the apparatus 1700 may include a data receiving module 1701. The carrier frequency band for the data transmission is divided into a plurality of sub-bandwidths. The data receiving module 1701 may be configured to receive data in resource elements in an order of sub-bandwidths; and receive, in each of the plurality sub-bandwidths, data in the resource elements first in an order of frequency domain and then in an order of time domain.

In an embodiment of the present disclosure, the apparatus 1700 may further include an indication receiving module 1702 and a data deletion module 1703. The indication receiving module 1702 may be configured to receive a resource occupation indication in downlink control information scrambled by a sub-bandwidth Radio Network Temporary Identity (RNTI). The data deletion module 1703 may be configured to delete, in response to receiving the resource occupation indication, corresponding unsuccessfully decoded data in storage.

Figure 18:
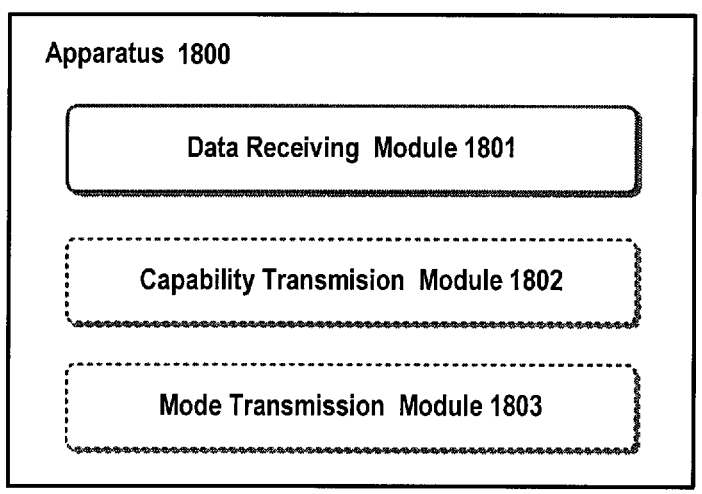
FIG. 18 schematically illustrates a block diagram of an apparatus for receiving uplink data according to an embodiment of the present disclosure.

FIG. 18 schematically illustrates a block diagram of an apparatus for uplink data receiving in a wireless communication system according to an embodiment of the present disclosure. The apparatus 1800 may be implemented at a network device, for example gNB, or other like network devices.

As illustrated in FIG. 18, the apparatus 1800 may include a data receiving module 1801. The carrier frequency band for the data transmission is divided into a plurality of sub-bandwidths. The data receiving module 1801 may be configured to receive data in resource elements in an order of sub-bandwidths; and receive, in each of the plurality sub-bandwidths, data in the resource elements first in an order of frequency domain and then in an order of time domain.

In an embodiment of the present disclosure, the apparatus 1800 may further comprise a capability transmission module 1802 and a mode receiving module 1803. The capability transmission module 1802 may be configured to transmit transmission capability information indicating whether a network device supports a sub-bandwidth transmission mode in which resource mapping based on sub-bandwidth can be performed. The mode transmission module 1803 may be configured to transmit, transmission mode information indicating whether the sub-bandwidth transmission mode is enabled. The data receiving module 1801 may be configured to receive data in resource elements based on sub-bandwidth in response to the transmission capability information indicating that the network device supports the sub-bandwidth transmission mode and the transmission mode information indicating that the sub-bandwidth transmission mode is enabled.

The transmission capability information may be received in an RRC signaling. The transmission mode information may be received in a downlink control indication.

Hereinbefore, apparatuses 1500 to 1800 are described with reference to FIGS. 15 to 18 in brief. It can be noted that the apparatuses 1500 to 1800 may be configured to implement functionalities as described with reference to FIGS. 3 to 14. Therefore, for details about the operations of modules in these apparatuses, one may refer to those descriptions made with respect to the respective steps of the methods with reference to FIGS. 3 to 14.

It is further noted that components of the apparatuses 1500 to 1800 may be embodied in hardware, software, firmware, and/or any combination thereof. For example, the components of apparatuses 1500 to 1800 may be respectively implemented by a circuit, a processor or any other appropriate selection device.

Those skilled in the art will appreciate that the aforesaid examples are only for illustration not limitation and the present disclosure is not limited thereto; one can readily conceive many variations, additions, deletions and modifications from the teaching provided herein and all these variations, additions, deletions and modifications fall the protection scope of the present disclosure.

In addition, in some embodiment of the present disclosure, apparatuses 1500 to 1800 may include at least one processor. The at least one processor suitable for use with embodiments of the present disclosure may include, by way of example, both general and special purpose processors already known or developed in the future. Apparatuses 1500 to 1800 may further include at least one memory. The at least one memory may include, for example, semiconductor memory devices, e.g., RAM, ROM, EPROM, EEPROM, and flash memory devices. The at least one memory may be used to store program of computer executable instructions. The program can be written in any high-level and/or low-level compliable or interpretable programming languages. In accordance with embodiments, the computer executable instructions may be configured, with the at least one processor, to cause apparatuses 1500 to 1800 to at least perform operations according to the method as discussed with reference to FIGS. 3 to 14 respectively.

Figure 19:
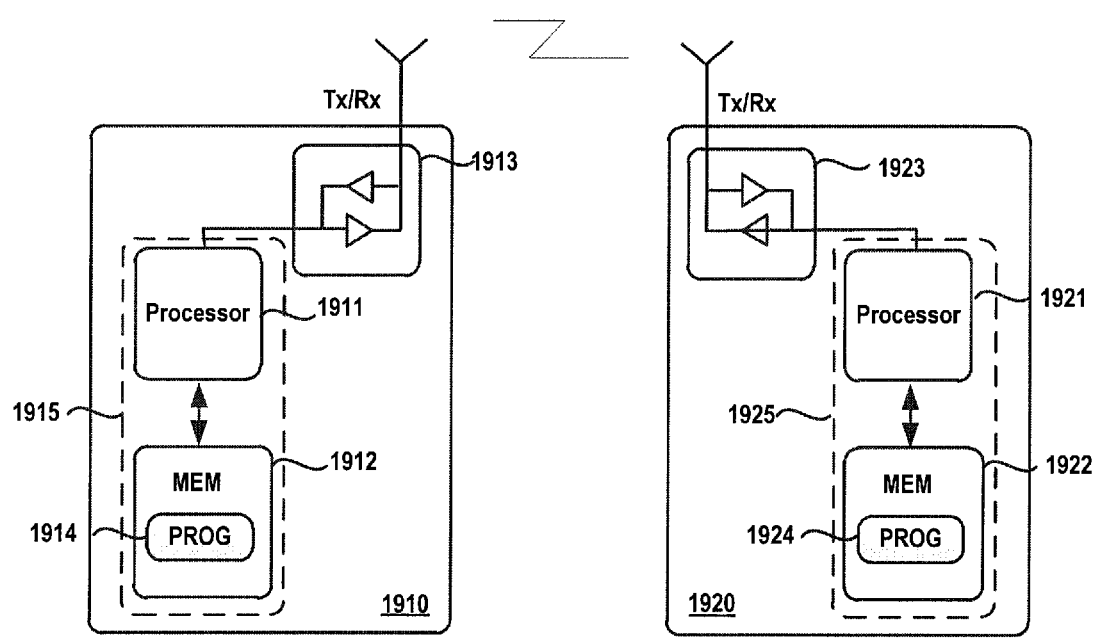
FIG. 19 schematically illustrates a simplified block diagram of an apparatus 1910 that may be embodied as or comprised in a network node like gNB, and an apparatus 1920 that may be embodied as or comprised in a terminal device like UE as described herein.

FIG. 19 schematically illustrates a simplified block diagram of an apparatus 1910 that may be embodied as or comprised in a network node like gNB, and an apparatus 1920 that may be embodied as or comprised in a terminal device like UE as described herein.

The apparatus 1910 comprises at least one processor 1911, such as a data processor (DP) and at least one memory (MEM) 1912 coupled to the processor 1911. The apparatus 1910 may further include a transmitter TX and receiver RX 1913 coupled to the processor 1911, which may be operable to communicatively connect to the apparatus 1920. The MEM 1912 stores a program (PROG) 1914. The PROG 1914 may include instructions that, when executed on the associated processor 1911, enable the apparatus 1910 to operate in accordance with embodiments of the present disclosure, for example method 300, 1000, 1200, 1400. A combination of the at least one processor 1911 and the at least one MEM 1912 may form processing means 1915 adapted to implement various embodiments of the present disclosure.

The apparatus 1920 comprises at least one processor 1911, such as a DP, and at least one MEM 1922 coupled to the processor 1911. The apparatus 1920 may further include a suitable TX/RX 1923 coupled to the processor 1921, which may be operable for wireless communication with the apparatus 1910. The MEM 1922 stores a PROG 1924. The PROG 1924 may include instructions that, when executed on the associated processor 1921, enable the apparatus 1920 to operate in accordance with the embodiments of the present disclosure, for example to perform method 300, 1100, 1200, 1300. A combination of the at least one processor 1921 and the at least one MEM 1922 may form processing means 1925 adapted to implement various embodiments of the present disclosure.

Various embodiments of the present disclosure may be implemented by computer program executable by one or more of the processors 1911, 1921, software, firmware, hardware or in a combination thereof.

The MEMs 1912 and 1922 may be of any type suitable to the local technical environment and may be implemented using any suitable data storage technology, such as semiconductor based memory devices, magnetic memory devices and systems, optical memory devices and systems, fixed memory and removable memory, as non-limiting examples.

The processors 1911 and 1921 may be of any type suitable to the local technical environment, and may include one or more of general purpose computers, special purpose computers, microprocessors, digital signal processors DSPs and processors based on multicore processor architecture, as non-limiting examples.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method, wherein a carrier frequency band for the data transmission is divided into a plurality of sub-bandwidths, and the method comprises:
    mapping resource elements for the data transmission in an order of sub-bandwidths; and
    mapping, in each of the plurality sub-bandwidths, the resource elements first in an order of frequency domain and then in an order of time domain,
    wherein the data transmission comprises uplink data transmission and the method further comprises:
    receiving, by a terminal device, transmission capability information indicating whether a network device supports a sub-bandwidth transmission mode in which resource mapping based on sub-bandwidth can be performed; and
    receiving, by a terminal device, transmission mode information indicating whether the sub-bandwidth transmission mode is enabled,
    wherein the method is performed in response to the transmission capability information indicating that the network device supports the sub-bandwidth transmission mode and the transmission mode information indicating that the sub-bandwidth transmission mode is enabled.

2. The method of claim 1, wherein the data transmission is downlink data transmission and the method further comprises:
transmitting a resource occupation indication in downlink control information scrambled by a sub-bandwidth Radio Network Temporary Identity (RNTI).

3. The method of claim 1, wherein the data transmission is a downlink data transmission and a listen before talk (LBT) operation is performed on a sub-bandwidth level, and wherein each sub-bandwidth used in the LBT operation has a control information transmission occasion.

4. The method of claim 3, wherein control information transmission occasions in the LBT operation are prioritized based on frequencies of respective sub-bandwidths.

5. The method of claim 1, wherein the data transmission is the downlink data transmission and wherein a listen before talk operation is performed on a sub-bandwidth level, and wherein a primary sub-bandwidth is selected based on the control information transmission scheduling.

6. The method of claim 1, wherein the transmission capability information is received in an RRC signaling; and/or wherein the transmission mode information is received in a downlink control indication.

7. A method, wherein a carrier frequency band for the data transmission is divided into a plurality of sub-bandwidths, and the method comprises:
receiving data in resource elements in an order of sub-bandwidths; and
receiving, in each of the plurality sub-bandwidths, data in the resource elements first in an order of frequency domain and then in an order of time domain, wherein the receiving data comprises receiving uplink data and the method further comprises:
transmitting, by a network device, transmission capability information indicating whether the network device supports a sub-bandwidth transmission mode in which resource mapping based on sub-bandwidth can be performed; and
transmitting, by the network device, transmission mode information indicating whether the sub-bandwidth transmission mode is enabled,
wherein the method is performed in response to the transmission capability information indicating that the network device supports the sub-bandwidth transmission mode and the transmission mode information indicating that the sub-bandwidth transmission mode is enabled.

8. The method of claim 7, wherein the receiving data comprises receiving downlink data and the method further comprises:
receiving, by a terminal device, a resource occupation indication in downlink control information scrambled by a sub-bandwidth Radio Network Temporary Identity (RNTI); and
deleting, by a terminal device, in response to receiving the resource occupation indication, corresponding unsuccessfully decoded data in storage.

9. The method of claim 7, wherein the receiving data comprises receiving downlink data and wherein a listen before talk operation is performed on a sub-bandwidth level, the method further comprises detecting control information in a priority based on frequencies of respective sub-bandwidths.

10. The method of claim 7, wherein the transmission capability information is transmitted in RRC signaling; and/or wherein the transmission mode information is transmitted in downlink control indication.

11. A transmission device, wherein a carrier frequency band for the data transmission is divided into a plurality of sub-bandwidths, the transmission device comprising:
a transceiver; and
a processor configured to:
map resource elements for the data transmission in an order of sub-bandwidths; and
map, in each of the plurality sub-bandwidths, the resource elements first in an order of frequency domain and then in an order of time domain,
wherein the transmission device is a network device, wherein a listen before talk operation is performed on a sub-bandwidth level, and wherein the processor is further configured to determine a primary sub-bandwidth based on the control information transmission scheduling,
wherein the transmission device comprises a terminal device and wherein the transceiver is further configured to:
receive transmission capability information indicating whether the network device supports a sub-bandwidth transmission mode in which resource mapping based on sub-bandwidth can be performed; and
receive transmission mode information indicating whether the sub-bandwidth transmission mode is enabled,
wherein the processor is configured perform the resource mapping based on sub-bandwidth in response to the transmission capability information indicating that the network device supports the sub-bandwidth transmission mode and the transmission mode information indicating that the sub-bandwidth transmission mode is enabled.

12. The transmission device of claim 11, wherein the transmission device is a network device, and wherein the transceiver is further configured to:
transmit a resource occupation indication in downlink control information scrambled by a sub-bandwidth Radio Network Temporary Identity (RNTI).

13. The transmission device of claim 11, wherein the transmission device is a network device, and wherein a listen before talk operation is performed on a sub-bandwidth level, and wherein each sub-bandwidth used in the LBT operation has a control information transmission occasion.

14. The transmission device of claim 11, wherein control information transmission occasions in the LBT operation are prioritized based on frequencies of respective sub-bandwidths.

* * * * *